United States Patent
Tayebati et al.

(10) Patent No.: US 7,376,352 B2
(45) Date of Patent: May 20, 2008

(54) CHIRP MANAGED LASER FIBER OPTIC SYSTEM INCLUDING AN ADAPTIVE RECEIVER

(75) Inventors: Parviz Tayebati, Weston, MA (US); Daniel Mahgerefteh, Los Angeles, CA (US); Kevin McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 591 days.

(21) Appl. No.: 11/015,686

(22) Filed: Dec. 17, 2004

(65) Prior Publication Data
US 2005/0169638 A1 Aug. 4, 2005

Related U.S. Application Data

(63) Continuation-in-part of application No. 10/289,944, filed on Nov. 6, 2002, now Pat. No. 6,963,685.

(60) Provisional application No. 60/629,741, filed on Nov. 19, 2004, provisional application No. 60/530,479, filed on Dec. 17, 2003.

(51) Int. Cl.
*H04B 10/16* (2006.01)

(52) U.S. Cl. ............... 398/147; 398/185; 398/186; 398/187; 398/201; 398/208

(58) Field of Classification Search ............ 398/201, 398/185–187, 147, 208
See application file for complete search history.

(56) References Cited

U.S. PATENT DOCUMENTS

| | | | |
|---|---|---|---|
| 4,561,119 A | 12/1985 | Epworth | |
| 4,805,235 A | 2/1989 | Henmi | |
| 5,416,629 A | 5/1995 | Huber | |
| 5,920,416 A | 7/1999 | Beylat et al. | |
| 6,104,851 A | * 8/2000 | Mahgerefteh | ............ 385/37 |
| 6,115,403 A | 9/2000 | Brenner et al. | |
| 6,331,991 B1 | 12/2001 | Mahgerefteh | |
| 6,963,685 B2 | 11/2005 | Mahgerefteh et al. | |
| 7,123,846 B2 * | 10/2006 | Tateyama et al. | ............ 398/209 |
| 2004/0096221 A1 | 5/2004 | Mahgerefteh et al. | |
| 2006/0029396 A1 | 2/2006 | Mahgerefteh et al. | |

FOREIGN PATENT DOCUMENTS

GB 2107147 4/1983

OTHER PUBLICATIONS

Chang-Hee Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.
Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.
Brent E. Little, Advances in MicroRing Resonators, Integrated Photonics Research Conference 2003.
Shalom, et al., On the Various Time Constants of Wavelength Changes of a DFB Laser Under Direct Modulation, IEEE Journal of Quantum Electronics, Oct. 1998, pp. 1816-1822, vol. 34, No. 10.

\* cited by examiner

*Primary Examiner*—Leslie Pascal
(74) *Attorney, Agent, or Firm*—Workman Nydegger

(57) ABSTRACT

A fiber optic communication system comprising:
an optical signal source adapted to produce a frequency modulated signal; and
an optical spectrum reshaper (OSR) adapted to convert the frequency modulated signal into a substantially amplitude modulated signal, wherein the optical spectrum reshaper is adapted to compensate for at least a portion of a dispersion in a transmission fiber;
and further including a transmission fiber coupled to the optical source, a receiver and a decision circuit coupled to the transmission fiber.

5 Claims, 3 Drawing Sheets

CHIRP MANAGED LASER FIBER OPTIC SYSTEM INCLUDING AN ADAPTIVE RECEIVER

REFERENCE TO PENDING PRIOR PATENT APPLICATIONS

This patent application is:

(i) a continuation-in-part of prior U.S. patent application Ser. No. 10/289,944, filed Nov. 06, 2002, now U.S. Pat, No. 6,963,685 by Daniel Mahgerefteh et al. for POWER SOURCE FOR A DISPERSION COMPENSATION FIBER OPTIC SYSTEM;

(ii) claims benefit of now abandoned prior U.S. Provisional Patent Application Ser. No. 60/530,479, filed Dec. 17, 2003 by Daniel Mahgerefteh et al. for OPTICAL TELECOMMUNICATION SYSTEM; and (iii) claims benefit of now abandoned prior U.S. Provisional Patent Application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT.

The three above-identified patent applications are hereby incorporated herein by reference.

FIELD OF THE INVENTION

This invention relates to signal transmissions in general, and more particularly to the transmission of optical signals.

BACKGROUND OF THE INVENTION

A typical fiber optic transmission system is shown in FIG. 1 and includes an optical transmitter 1002, a transmission fiber 1003, and a receiver 1004.

In a digital communications application, a key figure of merit for a transmitter in a communications link is its bit error rate (BER) performance, which is measured by a standard receiver.

More particularly, in a systems test, a known pattern of digital 1 and 0 bits is generated by a pattern generator 1001, converted to optical digital signal 1006 by the transmitter 1002, and injected into the communications link, e.g., fiber 1003. The data coming out of transmitter 1002 is often shown on a sampling oscilloscope in the form of an "eye diagram" 1006, as illustrated in FIG. 1. The "eye" diagram is generated by superimposing the pulse train repeatedly on itself, each time shifting it by one bit period. The top "rail" represents the 1s and the bottom "rail" rail represents the 0 bits. The data coming out of fiber 1003 can be shown on a sampling oscilloscope in the form of another optical eye 1020, and may be distorted by fiber dispersion. The receiver 1004 converts the optical signal into a corresponding electrical signal and determines if the bits are 1s or 0s using a decision circuit, which distinguishes is as signals above a certain preset decision threshold and 0s as signals below the threshold.

In a systems test, an error detector 1005 counts errors: the number of 1s that were intended as 0s and vice versa per unit time. This is called the bit error rate (BER). The error rate is measured as a function of the received optical power into the receiver, since the error rate is a function of the noise in the receiver as well as distortions in the eye.

A transmitter is typically characterized by its BER without fiber transmission, the so-called back-back BER, and its BER after transmission. FIG. 2 shows a BER curve versus received power for a particular transmitter. In FIG. 2, the back-back BER is shown at 1020 and BER after transmission is shown at 1021. The power penalty is shown at 1022. As is typical, the bit error rates for both back-back and after transmission reduce with increasing optical power, since the signal-to-noise ratio increases with increasing optical power. The optical power at which a certain back-back BER (typically $10^{-12}$) is achieved is called the sensitivity 1023 and is determined by a transmitter-receiver pair. The sensitivity of a receiver is defined as the sensitivity achieved with an optimal transmitter, typically an externally modulated $LiNbO_3$ transmitter, which produces well defined pulses with high contrast ratio and little distortion without transmission though fiber. The distortions caused by fiber dispersion degrade the transmitted BER 1021 (here after 96 km of standard fiber) and increase the received optical power required to achieve a $10^{-12}$ BER. The difference between the back-back sensitivity and the sensitivity after transmission is called the dispersion penalty and is measured in dB. In the present example, the dispersion penalty is 1.5 dB.

Both transmitter and receiver are optimized in order to reduce the dispersion penalty to a desired value. Telecommunication standards at present call for a dispersion penalty of <2 dB. If the back-back sensitivity of the transmitter is worse than the receiver sensitivity, there is an additional back-back penalty, which reduces the overall power budget. The optical power budget is the sum of the optical loss and dispersion penalties, as well as any margin that the system may impose.

It is, therefore, generally desirable to optimize a transmitter (in order to meet the desired power budget) by reducing both the back-back penalty and the dispersion penalty.

A system for long-reach lightwave data transmission through optical fibers has been described in U.S. patent application Ser. No. 10/289,944, filed Nov. 06, 2002 by Daniel Mahgerefteh et al. for POWER SOURCE FOR A DISPERSION COMPENSATION FIBER OPTIC SYSTEM, which patent application is hereby incorporated by reference. Azna LLC of Wilmington, Mass. sometimes refers to the transmitter apparatus of this patent application as a Chirp Managed Laser (CML™). In this system, a frequency modulated (FM) source is followed by an optical discriminator, also sometimes referred to as an optical spectrum reshaper (OSR), which converts frequency modulation into a substantially amplitude modulated (AM) signal and partially compensates for the dispersion in the transmission fiber.

Also, in U.S. Provisional Patent Application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT, which patent application is hereby incorporated herein by reference, there is disclosed a CML™ system that can be adapted to transmit a digital signal across >200 km, at 10 Gb/s, in a standard fiber having a net dispersion of 3200 ps/nm. This is approximately twice as far as can be achieved using a standard external modulated transmitter. In this patent application, it is disclosed that the amplitude and frequency profile of the transmitted signal can be adjusted so as to reduce the BER after transmission through dispersive fiber.

It is an object of the present invention to further decrease the bit error rate of the transmitted signal after propagation through fiber by adjusting certain parameters of the receiver in conjunction with the parameters of the transmitter.

SUMMARY OF THE INVENTION

This and other objects of the present invention are addressed by the provision and use of a novel fiber optic communications system.

In one form of the invention, there is provided a fiber optic communication system, comprising:

an optical signal source adapted to produce a frequency modulated signal; and an optical spectrum reshaper (OSR) adapted to convert the frequency modulated signal into a substantially amplitude modulated signal, wherein the optical spectrum reshaper is adapted to compensate for at least a portion of a dispersion in a transmission fiber;

and further including a transmission fiber coupled to the optical source, a receiver and a decision circuit coupled to the transmission fiber.

In another form of the invention, there is provided a fiber optic system comprising:

an optical signal source adapted to produce a frequency modulated signal;

an optical spectrum reshaper (OSR) adapted to convert the frequency modulated signal to a substantially amplitude modulated signal;

a transmission fiber for receiving the substantially amplitude modulated signal from the OSR and transport the same along a length;

a receiver for receiving the substantially amplitude modulated signal from the transmission fiber, the receiver comprising an optical-to-electrical converter and a decision circuit having a decision threshold voltage and a decision threshold time;

wherein the parameters of the optical signal source and the decision threshold of the receiver are simultaneously adjusted so as to provide the desired dispersion penalty after transmission through the fiber.

In another form of the invention, there is provided a method for transmitting an optical signal, comprising:

producing an optical frequency modulated signal;

passing the frequency modulated signal to an optical spectrum reshaper (OSR) so as to convert the frequency modulated signal to a substantially amplitude modulated signal;

passing the the substantially amplitude modulated signal through a fiber;

passing the substantially amplitude modulated signal to an optical-to-electrical converter so as to convert the substantially amplitude modulated signal from an optical form to a corresponding electrical form;

passing the corresponding electrical signal to a decision circuit adapted to detect a decision threshold voltage and a decision threshold time;

wherein the parameters of the optical frequency modulated signal, the decision threshold voltage and the decision threshold time are simultaneously adjusted so as to provide the desired dispersion penalty after transmission through the fiber.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 1:
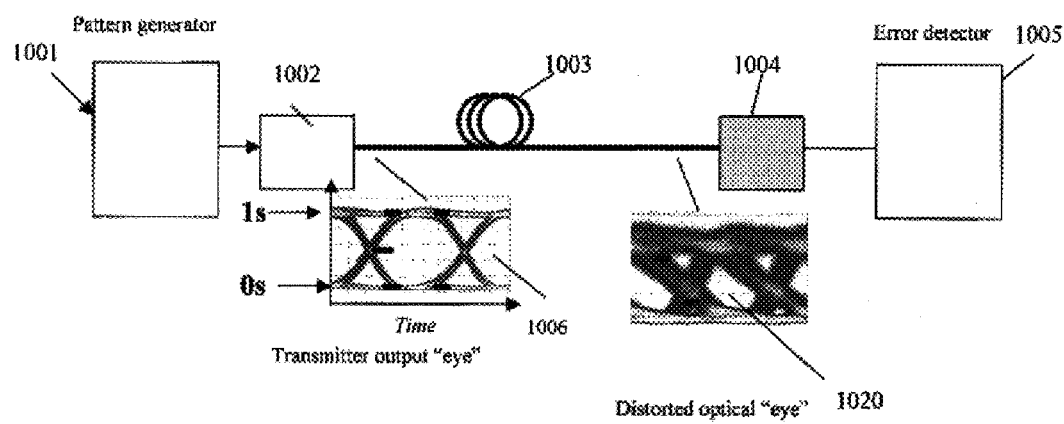
FIG. 1 is a typical fiber optic transmission system.
Figure 2:
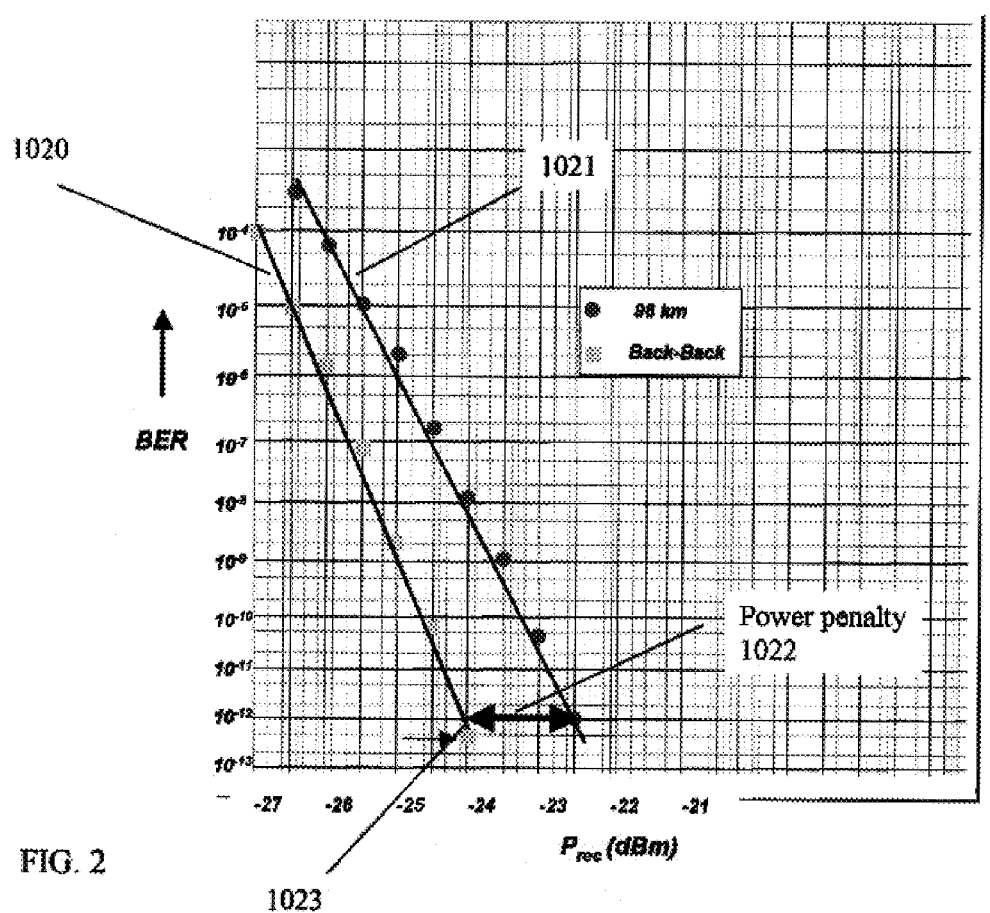
FIG. 2 is a schematic diagram showing a BER curve verses receive power for a particular transmitter.
Figure 3:
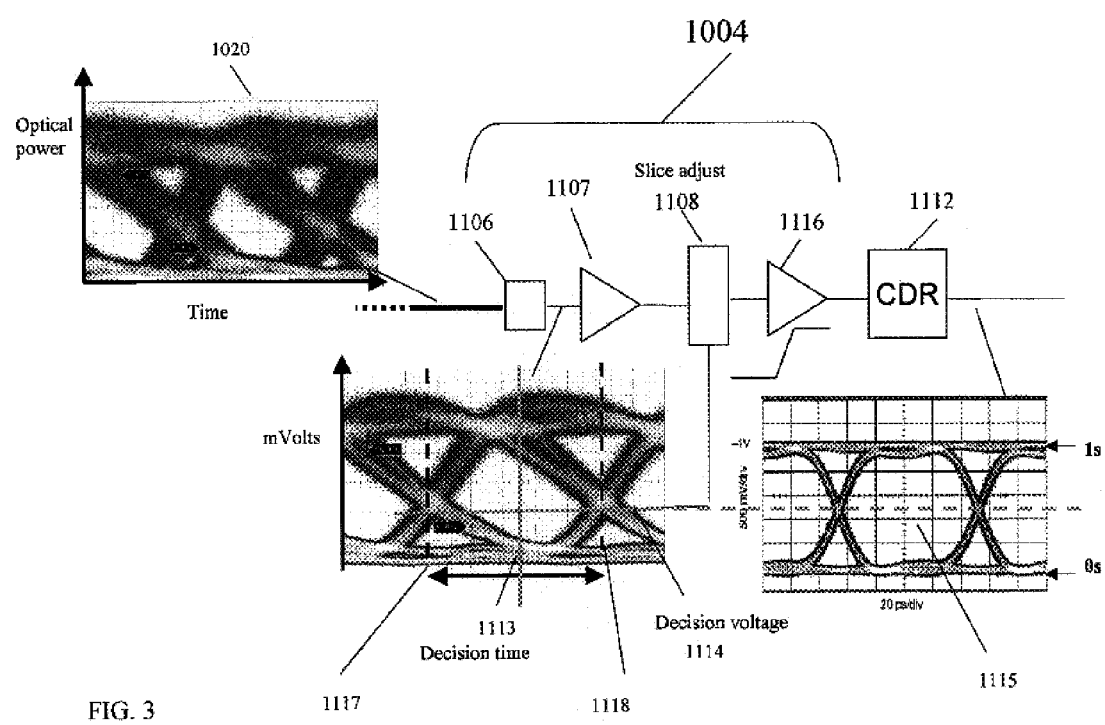
FIG. 3 is a schematic diagram showing a novel system formed in accordance with the present invention.

As shown in FIG. 3, a typical digital optical receiver 1004 is composed of several components that together decide if the incoming bit is a 1 or a 0. First an optical-to-electrical converter (O/E) 1106, such as a pin photodiode or an avalanche photodiode (APD), converts the optical signal to an electrical current. The bandwidth of the converter is typically about 0.8 times the bit rate, so some of the high frequency noise and distortions of the optical eye are filtered out by the O/E. The O/E also has a transimpedence amplifier (TIA) 1107, which converts the current to a voltage and provides some gain. A so-called "slice" adjust circuit 1108 adds a DC voltage to the output of the TIA and thus adjusts the decision threshold voltage 1114. A limiting amplifier 1116 provides high gain and clamps the signal to a fixed voltage at the 1s and 0 levels beyond its linear range. The linear range is typically about 2 mV to about 15 mV. A clock data recovery circuit (CDR) 1112 finds the edges 1117 and 1118 of the input eye and regenerates the input data based on the decision time 1113 and decision voltage 1114. The CDR 1112 produces a 1 when the voltage at the decision time 1113 is above the decision voltage 1114, and a zero when it is below the decision voltage 1114. The eye diagram 1115 represents the signal coming out of CDR 1112.

The importance of the slice adjust circuit 1108 now becomes clear. Since distortions caused by fiber dispersion can make the eye asymmetric, the optimum decision voltage may not be at the average of the 1s and 0s. For example, for 100 km transmission, the optimum is typically below the average. Also avalanche photodiode (APD) noise statistics, as well as optical amplifier noise (if it is present in the receiver) make the 1s more noisy than the 0s. Hence noise statistics can also cause the optimum decision point to shift below the average.

The decision timing may also be optimized with a separate circuit.

It is, therefore, an embodiment of the present invention to adjust the decision (slice) voltage at the receiver, or the decision timing, or both, in conjunction with the transmitter parameters, in order to achieve the desired dispersion penalty after transmission through a length of fiber.

Other techniques for reducing the BER at the receiver include forward error correction (FEC), dynamic decision threshold optimization circuits, and electronic dispersion compensation circuits. All of these and others may be optimized in conjunction with the parameters of the CML™ system to achieve the desired dispersion penalty or power budget.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic communication system, comprising:

an optical signal source adapted to produce a frequency modulated signal; and an optical spectrum reshaper (OSR) adapted to convert the frequency modulated signal into a substantially amplitude modulated signal, wherein the optical spectrum reshaper is adapted to compensate for at least a portion of a dispersion in a transmission fiber;

and further including a transmission fiber coupled to the optical source, a receiver and a decision circuit coupled to the transmission fiber, wherein a voltage decision threshold of the receiver is adjusted so as to achieve a desired dispersion penalty;

wherein, additionally, a time decision threshold of the receiver is adjusted to achieve the desired dispersion penalty.

2. A fiber optic communication system, comprising:

an optical signal source adapted to produce a frequency modulated signal; and an optical spectrum reshaper (OSR) adapted to convert the frequency modulated signal into a substantially amplitude modulated signal, wherein the optical spectrum reshaper is adapted to compensate for at least a portion of a dispersion in a transmission fiber;

and further including a transmission fiber coupled to the optical source, a receiver and a decision circuit coupled to the transmission fiber, wherein the frequency profile and amplitude profile of the signal at the output of the transmitter, and a decision threshold of the receiver, are simultaneously adjusted so as to achieve a desired dispersion penalty at the receiver after the transmission fiber.

3. A fiber optic system comprising:

an optical signal source adapted to produce a frequency modulated signal;

an optical spectrum reshaper (OSR) adapted to convert the frequency modulated signal to a substantially amplitude modulated signal;

a transmission fiber for receiving the substantially amplitude modulated signal from the OSR and transport the same along a length;

a receiver for receiving the substantially amplitude modulated signal from the transmission fiber, the receiver comprising an optical-to-electrical converter and a decision circuit having a decision threshold voltage and a decision threshold time;

wherein the parameters of the optical signal source and the decision threshold of the receiver are simultaneously adjusted so as to provide the desired dispersion penalty after transmission through the fiber.

4. A method for transmitting an optical signal, comprising:

producing an optical frequency modulated signal;

passing the frequency modulated signal to an optical spectrum reshaper (OSR) so as to convert the frequency modulated signal to a substantially amplitude modulated signal;

passing the substantially amplitude modulated signal through a fiber;

passing the substantially amplitude modulated signal to an optical-to-electrical converter so as to convert the substantially amplitude modulated signal from an optical form to a corresponding electrical form;

passing the corresponding electrical signal to a decision circuit adapted to detect a decision threshold voltage and a decision threshold time;

wherein the parameters of the optical frequency modulated signal, the decision threshold voltage and the decision threshold time are simultaneously adjusted so as to provide the desired dispersion penalty after transmission through the fiber.

5. A fiber optic communication system, comprising:

an optical signal source adapted to produce a frequency modulated signal; and an optical spectrum reshaper (OSR) adapted to convert the frequency modulated signal into a substantially amplitude modulated signal, wherein the optical spectrum reshaper is adapted to compensate for at least a portion of a dispersion in a transmission fiber;

a transmission fiber coupled to the optical source; and a receiver and a decision circuit coupled to the transmission fiber, the receiver operable to adjust a time decision threshold thereof to achieve a desired dispersion penalty.

* * * * *